(12) United States Patent
Rowley

(10) Patent No.: US 8,745,151 B2
(45) Date of Patent: Jun. 3, 2014

(54) WEB PAGE PROTECTION AGAINST PHISHING

(75) Inventor: Peter A. Rowley, Ben Lomond, CA (US)

(73) Assignee: Red Hat, Inc., Raleigh, NC (US)

( * ) Notice: Subject to any disclaimer, the term of this patent is extended or adjusted under 35 U.S.C. 154(b) by 1508 days.

(21) Appl. No.: 11/595,414

(22) Filed: Nov. 9, 2006

(65) Prior Publication Data

US 2008/0115214 A1 May 15, 2008

(51) Int. Cl.
| G06F 15/16 | (2006.01) |
| H04N 7/16 | (2011.01) |
| G06F 7/04 | (2006.01) |
| G06F 17/30 | (2006.01) |

(52) U.S. Cl.
USPC ................... 709/217; 726/26; 726/27

(58) Field of Classification Search
CPC ................................... H04L 63/1483
USPC ...................... 709/217; 726/26–27
See application file for complete search history.

(56) References Cited

U.S. PATENT DOCUMENTS

| 7,624,110 | B2 | 11/2009 | Alagna et al. |
| 7,668,921 | B2 | 2/2010 | Proux et al. |
| 2002/0099693 | A1 | 7/2002 | Kofsky |
| 2005/0262210 | A1 | 11/2005 | Yu |
| 2006/0041508 | A1 | 2/2006 | Pham et al. |
| 2006/0069697 | A1* | 3/2006 | Shraim et al. ................. 707/102 |
| 2006/0080437 | A1 | 4/2006 | Lake |
| 2006/0123478 | A1* | 6/2006 | Rehfuss et al. ................. 726/22 |
| 2006/0212931 | A1* | 9/2006 | Shull et al. ...................... 726/10 |
| 2006/0239430 | A1* | 10/2006 | Gue et al. ................. 379/201.05 |
| 2006/0253584 | A1* | 11/2006 | Dixon et al. ................... 709/225 |
| 2006/0294223 | A1* | 12/2006 | Glasgow et al. .............. 709/224 |
| 2007/0128899 | A1* | 6/2007 | Mayer ........................... 439/152 |

FOREIGN PATENT DOCUMENTS

WO    WO 2004/055632 A2 *  7/2004

OTHER PUBLICATIONS

PCT International Preliminary Report on Patentability, PCT/US2007/022354 filed Oct. 19, 2007, mailed May 22, 2009.
"Microsoft Phishing Filter: A New Approach to Building Trust E-Commerce Content", Accessed at microsoft.comdownloads/details/aspx?FamilyId=B4022C66-99BC-4A30-9ECC-8BDEFCF0501D&displaylang=en, (Sep. 20, 2005), 11 pages.
Red Hat, Inc., Non-Final Office Action for U.S. Appl. No. 11/549,828, mailed Mar. 15, 2010.
Red Hat, Inc., Final Office Action for U.S. Appl. No. 11/549,828, mailed Jun. 23, 2010.
Red Hat, Inc., Non-Final Office Action for U.S. Appl. No. 11/549,828, mailed Dec. 22, 2010.
Red Hat, Inc., Final Office Action for U.S. Appl. No. 11/549,828, mailed Apr. 26, 2010.

(Continued)

*Primary Examiner* — Nicholas Jensen
(74) *Attorney, Agent, or Firm* — Lowenstein Sandler LLP

(57) ABSTRACT

Some embodiments of a method and apparatus for protecting web pages against phishing have been presented. In one embodiment, a user interface control is created at a client machine. A user may submit a request to protect a web page via the user interface control. In response to the request, a web page protection module may protect the web page against phishing based on content of the web page. In some embodiments, the web page protection module may be integrated with a network access application, such as, for example, as a plug-in to a browser.

24 Claims, 4 Drawing Sheets

(56) References Cited

OTHER PUBLICATIONS

Red Hat, Inc. Non-Final Office Action for U.S. Appl. No. 11/549,828, mailed Sep. 22, 2011.
Advisory Action for U.S. Appl. No. 11/549,828, mailed Sep. 23, 2010.
Advisory Action for U.S. Appl. No. 11/549,828, mailed Jul. 19, 2011.
Final Office Action for U.S. Appl. No. 11/549,828, mailed Apr. 25, 2012.
International Search Report and Written Opinion of the International Searching Authority, PCT/US07/22354 filed Oct. 19, 2007, mailed Jun. 9, 2008, 11 pages.
International Search Report and Written Opinion of the International Searching Authority, PCT/US07/22354 filed Oct. 19, 2007, mailed Jun. 10, 2008, 10 pages.
USPTO, Advisory Action for U.S. Appl. No. 11/549,828 mailed Sep. 23, 2010.
USPTO, Advisory Action for U.S. Appl. No. 11/549,828 mailed Jul. 19, 2011.
USPTO, Final Office Action for U.S. Appl. No. 11/549,828 mailed Apr. 25, 2012.

* cited by examiner

WEB PAGE PROTECTION AGAINST PHISHING

TECHNICAL FIELD

Embodiments of the present invention relate to security in a public network environment, and more specifically to protecting web pages against phishing.

BACKGROUND

With the rapid proliferation of network-related technologies, more and more users routinely carry out online transactions to manage business and/or personal affairs using online services, such as online banking, online stock brokerage, online shopping, etc. In the current document, an online transaction refers to a transaction performed at least in part over a network, at least a portion of which is publicly accessible, such as the Internet, a combination of the Internet and an intranet, etc. In online transactions, sensitive personal information may be submitted over the publicly accessible network via legitimate web pages. Although online transactions provide great convenience to users in general, unfortunately, criminals may attempt to steal sensitive personal information over the network from some unsuspecting users. Once the criminals obtain such information, they may use the information to commit identity thefts to steal thousands of dollars from the victims.

One common way to steal information online is phishing. Phishing in general is to steal information online by trickery. A phisher may set up a counterfeit web page, also referred to as a spoofed web page. The counterfeit web page may be similar to a legitimate web page such that the counterfeit web page may trick unsuspecting users to provide their personal information via the counterfeit web page to the criminal. For instance, the counterfeit web page may have a uniform resource locator (URL) similar to the legitimate web page such that a user misspelling the URL of the legitimate web page may be directed to the counterfeit web page. Alternatively, the criminal may send electronic mail posing as the entity running the legitimate web page to users with a link to the counterfeit web page in order to scam the users. The counterfeit web page may request personal information, such as passwords to financial accounts (e.g., bank accounts, brokerage accounts, retirement saving accounts, etc.), credit card numbers, social security numbers, bank account numbers, etc.

Currently, some browser vendor maintains a central list of the URLs of some known counterfeit web pages. When a browser attempts to access a web page, the browser may access the central list to check if the URL of the web page is in the central list. If the URL is in the central list, then the web page is a known counterfeit web page and the browser may block access to the web page. The browser vendor may periodically update the central list with URLs of newly found counterfeit web pages.

However, users may find the above protection against phishing inconvenient because the users have to constantly rely on support from the browser vendor. Furthermore, as time goes by, the central list may grow substantially, and it may take a long time to access the central list. Moreover, the central list may not include newly created counterfeit web pages not yet identified because no one has reported the newly created counterfeit web pages to the browser vendor yet. This may result in a security loophole, which criminals may exploit.

BRIEF DESCRIPTION OF THE DRAWINGS

The present invention is illustrated by way of example, and not by way of limitation, in the figures of the accompanying drawings and in which.

DETAILED DESCRIPTION

Figure 1:
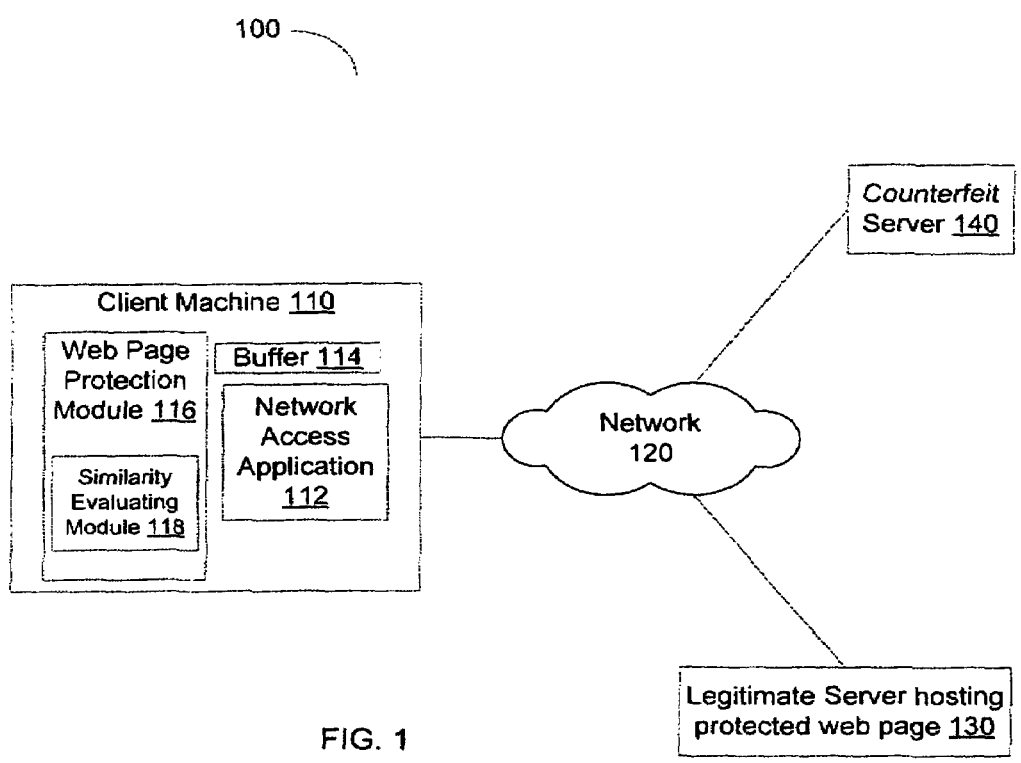
FIG. 1 illustrates an exemplary embodiment of a network architecture in which embodiments of the present invention may be implemented.

Described herein is a method and apparatus for protecting web pages from phishing. In one embodiment, a user interface control is created at a client machine. A user may submit a request to protect a web page via the user interface control. In response to the request, a web page protection module may protect the web page against phishing based on content of the web page. In some embodiments, the web page protection module may be integrated with a network access application, such as, for example, as a plug-in to an Internet browser.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary embodiment of a network architecture 100 in which embodiments of the present invention may be implemented. The network architecture 100 may include a client machine 110, a network 120, a legitimate server 130, and a counterfeit server 140. The client machine 110 may include a network access application 112, a buffer 114, and a web page protection module 116. The network access application 112 may access the network 120 from the client machine 110. Some examples of the network access application 112 include an Internet browser, an electronic mail engine, etc. Some examples of the client machine 110 include a desktop personal computer (PC), a laptop PC, a personal digital assistant (PDA), a cellular telephone or mobile telephone, etc. The client machine 110 may be coupled to the network 120 via wired connection, wireless connection, or a combination of both. The network 120 may include various kinds of networks, such as local area network (LAN), wide area network (WAN), wireless network, wired network, etc. At least a portion of the network 120 includes a publicly accessible network, such as the Internet. In addition to the client machine 110, the network 120 is further coupled to the legitimate server 130 and the counterfeit server 140.

Note that any or all of the components and the associated hardware illustrated in FIG. 1 may be used in various embodiments of the network architecture 100. However, it should be appreciated that other configurations of the network architecture 100 may include more or fewer devices than those shown in FIG. 1.

In some embodiments, the legitimate server 130 hosts a legitimate web page accessible by users, such as customers, patrons, employees, etc., of an entity running the legitimate server 130. The entity may include an individual person, a partnership, a corporation or company, a governmental agency, etc. In the current description, a web page generally refers to a file, a set of files, or other content accessible over a network and/or viewable via the network access application 112 (e.g., files in Portable Document Format (PDF)). A web page may include one or more of an audio file, a video file, a text file, and/or a file coded in different kinds of languages, such as hypertext markup language (HTML), extensible markup language (XML), or a script language (e.g., JavaScript, Active Server Pages (ASP), etc.). Via the legitimate web page, a user may submit sensitive personal information, such as passwords, bank account number, credit card number, social security number, etc., to the legitimate server 130 to use some legitimate online services. However, as discussed above, phishers may attempt to steal such sensitive information by setting up a counterfeit web page similar to the legitimate web page.

In some embodiments, a counterfeit server 140 is also coupled to the network 120 to host the counterfeit web page. The counterfeit web page may appear similar in various aspects to the legitimate web page. For instance, the counterfeit web page may display graphics (e.g., logos, symbols, photographs, pictures, etc.) similar or identical to the graphics in the legitimate web page. Alternatively, the counterfeit web page may include text (e.g., names, titles, slogans, instructions, etc.) similar or substantially identical to the text in the legitimate web page. By appearing similar to the legitimate web page, the counterfeit web page may trick unsuspecting users into believing that the counterfeit web page is the legitimate web page and thus, providing personal information to the counterfeit server 140 via the counterfeit web page. To protect users from such scam, the web page protection module 116 may perform some embodiments of the process described below to protect the legitimate web page against phishing based on content of the legitimate web page. The web page protection module 116 may be a module integrated with the network access application 112, such as a plug-in to an Internet browser, or part of an independent application.

In some embodiments, the web page protection module 116 creates a user interface control to allow a user to request protection of the legitimate web page. The user interface control may include a button displayed within a graphical user interface (GUI) of the network access application 112, such as a browser window. Alternatively, the user interface control may be in the form of an option that can be activated in a menu of the browser.

In response to the user's request to protect the legitimate web page, the web page protection module 116 may cache the legitimate web page in the buffer 114. To cache the legitimate web page, the web page protection module 116 may store a copy of a current version of the legitimate web page in the buffer 114, or at least a portion of the current version of the legitimate web page (e.g., the legitimate web page without the HTML tags). In some embodiments, the web page protection module 116 may cache the legitimate web page periodically, such as daily, weekly, monthly, etc., so that the buffer 114 may contain an updated copy of the legitimate web page. Alternatively, the web page protection module 116 may cache the legitimate web page every time the user visits the legitimate web page. Further, the web page protection module 116 may repeat caching the legitimate web page by storing the differences between the current version and the earlier cached version of the legitimate web page.

In some embodiments, the web page protection module 116 further includes a similarity evaluating module 118. When the user visits, or is about to visit, a second web page having a uniform resource locator (URL) different from the URL of the legitimate web page, the similarity evaluating module 118 may compare the content of the legitimate web page and content of the second web page to determine how similar the two web pages are. As is well known in the art, an URL is an address or a pathname for accessing a web page over a network. The similarity evaluating module 118 may perform different tests to determine the similarity between the legitimate web page and the second web page. Some examples are discussed below to illustrate the concept. However, it should be appreciated that the examples below are for illustrative purpose only, not limiting the scope of the appending claims.

One way to determine the similarity between the legitimate web page and the second web page is a similarity test based on word counts of a set of words in both web pages. In one embodiment, the similarity evaluating module 118 removes from both web pages formatting commands (e.g., HTML tags), as well as objects not displayed to the user on the two web pages. Then the similarity evaluating module 118 may sort the remaining words in each web page and put the sorted words into a list. In some embodiments, duplicate words are allowed in the list. Alternatively, duplicate words may be ignored. In some embodiments, a set of predetermined common words (e.g., the, a, as, it, etc.) is ignored. Then the similarity evaluating module 118 may ignore words that appear in only one of the web pages and may count words common to both web pages. In one example, a word count of a word appearing in the legitimate web page is l and the word count of the word in the second web page is s. To determine the similarity between the two web pages, the similarity evaluating module 118 may calculate the absolute difference $\Delta$ between l and s. The lower the value of $\Delta$ is, the more similar the two web pages are. If $\Delta=0$ for each word in the list, or at least most of the words in the list, then the two web pages may be substantially identical.

Furthermore, there may be different thresholds set for $\Delta$, which may give a difference confidence level for the similarity test above. In some embodiments, the web page protection module 116 may create a second user interface control to allow the user to adjust a similarity threshold. For example, the web page protection module 116 may create a pop-up window with a field for inputting one or more threshold values, a set of buttons to adjust the values of different thresholds, etc.

In addition to, or as an alternative to, the similarity tests discussed above, the web page protection module 116 may perform other tests to determine how likely the second web page is a counterfeit of the legitimate web page. In one embodiment, the web page protection module 116 applies a form test on the second web page to determine how likely the second web page is a counterfeit. If the second web page contains a form that has one or more editable fields, then the test passes. In other words, the second web page may likely be a counterfeit. The form test may be useful in screening out potential counterfeit web pages to prevent phishing because web pages having a form via which information is passed to the hosting server are likely to be counterfeit web pages set up for phishing.

Alternatively, the web page protection module 116 may perform a password test on the second web page. If the second web page contains a form that has one or more editable fields and at least one of the editable fields is a password field, then the test passes. In other words, the second web page may likely be a counterfeit web page set up for phishing.

Note that the web page protection module 116 may perform any of the above tests, other similarity evaluating tests, or a combination of two or more tests to determine how likely the second web page is a counterfeit of the legitimate web page. The examples described above are merely for illustrating the concept.

In response to determining that the second web page is likely to be a counterfeit of the legitimate web page, the web page protection module 116 may take various actions to protect the legitimate web page and the user. For example, the web page protection module 116 may block access to the second web page. Alternatively, the web page protection module 116 may alert the user that the second web page is likely to be a counterfeit, such as by displaying a warning message in a pop-up window or in the browser, etc. Alternatively, the web page protection module 116 may report the second web page to a system administrator who is responsible for network security. The web page protection module 116 may send information about the second web page to a database maintaining a list of suspicious counterfeit web pages. In sum, the web page protection module 116 may take one of the above or other courses of action or a combination of actions in different embodiments when the web page protection module 116 has determined that the second web page is likely to be a counterfeit.

Figures 2A, 2B:
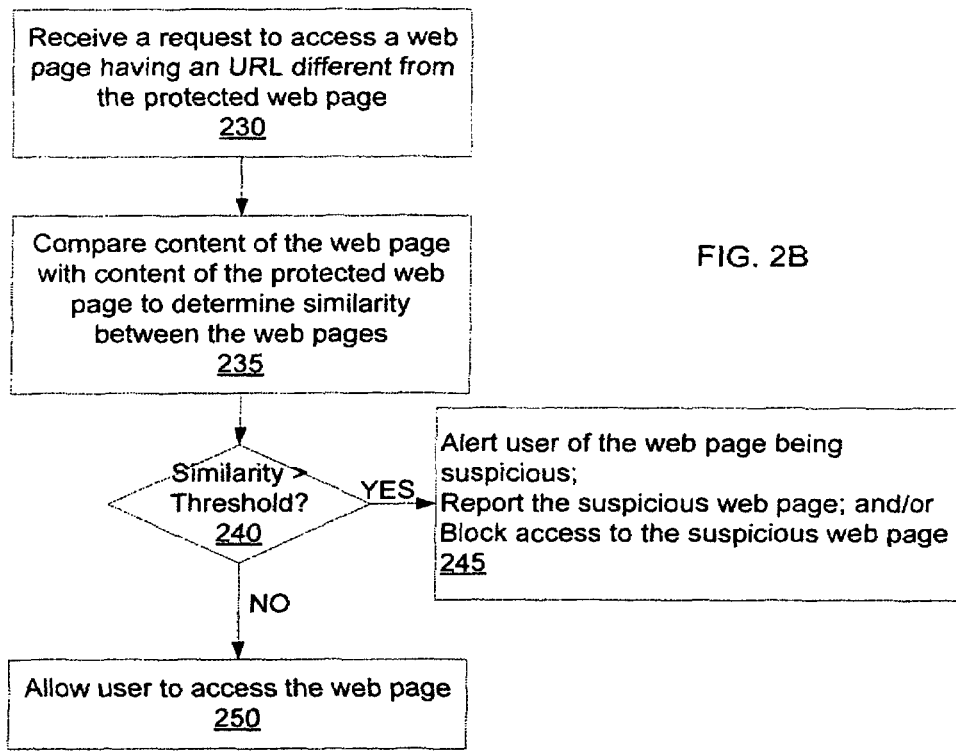
FIG. 2A illustrates a flow diagram of one embodiment of a process to initiate web page protection against phishing.
FIG. 2B illustrates a flow diagram of one embodiment of a process to protect a web page.

FIG. 2A illustrates a flow diagram of one embodiment of a process to initiate web page protection against phishing. The process may be performed by processing logic that may comprise hardware (e.g., circuitry, dedicated logic, programmable logic, microcode, etc.), software (such as instructions run on a processing device), or a combination thereof. In one embodiment, various modules in the client machine 110 of FIG. 1 perform at least a portion of the process.

Referring to FIG. 2A, processing logic receives a user request to protect a web page (processing block 210). Processing logic may receive the user request via a user interface control integrated with a network access application (e.g., an Internet browser). In response to the request, processing logic may cache the web page (processing block 215). Furthermore, processing logic may cache the web page again later. In some embodiments, processing logic caches the web page periodically, such as daily, weekly, monthly, etc. Alternatively, processing logic may cache the web page every time the user visits the web page.

After caching the web page, processing logic activates protection of the web page against phishing (processing block 220). In some embodiments, processing logic compares the protected web page with a second web page when the user visits, or is about to visit, the second web page, where the second web page has an URL different from the URL of the protected web page. Based on the content of the protected web page and the second web page, processing logic may determine the likelihood of the second web page being a counterfeit of the protected web page. The more similar the two web pages are, the more likely the second web page is a counterfeit of the protected web page. Details of some embodiments of a process to protect the web page against phishing are discussed below with reference to FIG. 2B.

FIG. 2B illustrates a flow diagram of one embodiment of a process to protect a web page. The process may be performed by processing logic that may comprise hardware (e.g., circuitry, dedicated logic, programmable logic, microcode, etc.), software (such as instructions run on a processing device), or a combination thereof. In one embodiment, various modules in the client machine 110 of FIG. 1 perform at least a portion of the process.

Referring to FIG. 2B, processing logic receives a request from a user to access a web page having an URL different from the URL of the protected web page (processing block 230). The user may submit the request by clicking on a link (e.g., a hyperlink) in another web page, an electronic mail message, etc.

In some embodiments, processing logic compares content of the web page with content of the protected web page to determine similarity between the two web pages (processing block 235). Processing logic may perform various tests to evaluate the similarity between the two web pages. Details of some exemplary tests have been discussed above with reference to FIG. 1.

After determining the similarity between the two web pages, processing logic checks if a value of the similarity determined is greater than a predetermined threshold (processing block 240). The value of the threshold may be adjustable as described above. In some embodiments, there may be multiple thresholds.

If processing logic determines that the value of the similarity is below the predetermined threshold at processing block 240, the likelihood of the web page being a counterfeit of the protected web page is relatively low, and thus, processing logic transitions to processing block 250 to allow the user to access the web page. Otherwise, the likelihood of the web page being a counterfeit of the protected web page is relatively high, and thus, processing logic transitions to processing block 245. Processing logic may take different course of action to protect the user, such as, for example, alerting the user of the web page being suspicious, reporting the suspicious web page, and/or blocking access to the suspicious web page, etc. As mentioned above, there may be multiple thresholds and thus, processing logic may take different course of action depending on which threshold the value of the similarity determined has passed. The course of action may range from warning the user of the web page being a potential counterfeit to blocking access to the web page. Some exemplary actions have been described above.

Figure 3:
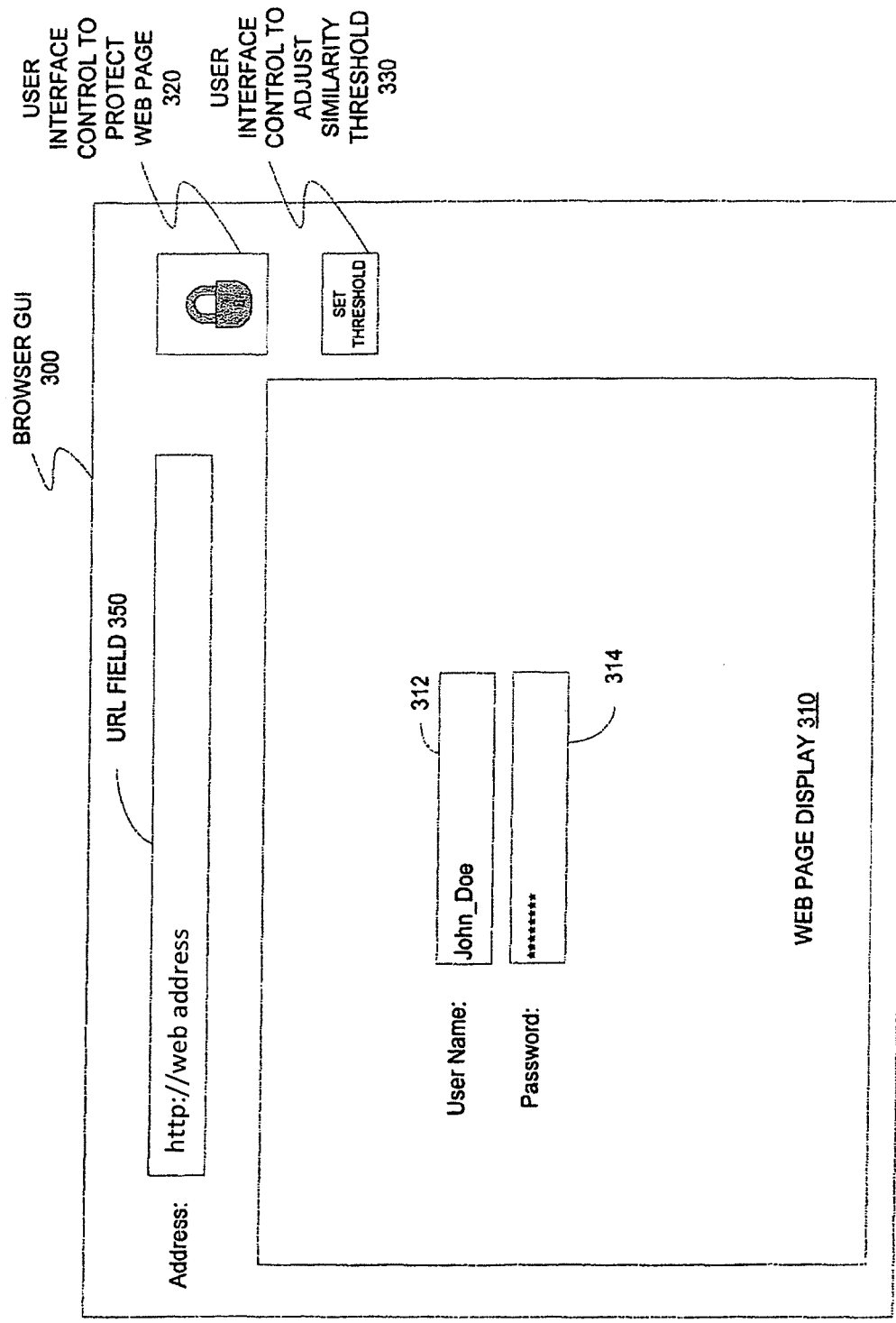
FIG. 3 illustrates one embodiment of a graphical user interface in which embodiments of the present invention may be implemented.

FIG. 3 illustrates one embodiment of a GUI in which embodiments of the present invention may be implemented. The GUI 300 includes a web page display 310, a first user interface control 320 to protect a web page, a second user interface control 330 to set and/or adjust one or more similarity thresholds, and an URL field 350. In some embodiments, a network access application, such as an Internet browser, and a web page protection module (e.g., the web page protection module 116 in FIG. 1) may create the GUI. To access a web page, a user may enter the URL of the web page in the URL field 350 to cause the network access application to retrieve and display the web page.

A user may actuate the first user interface control 320 to submit a request to protect the web page. For instance, the first user interface control 320 may include a button and the user may click on the button to request protection of the web page currently being displayed in the web page display 310. The protected web page typically includes a form and/or a template for the user to input personal information, such as user names, passwords, account numbers, etc. For example, referring to FIG. 3, the web page displayed in the web page display 310 includes a user name field 312 and a password field 314. The network access application may transmit the information input from the user to a server hosting the web page.

In response to the user actuating the first user interface control 320, the web page currently displayed in the display 310 is cached. Thereafter, when the user visits, or is about to visit, a second web page having an URL different from the URL of the protected web page, a web page protection module (such as the web page protection module 116 in FIG. 1) may compare content of the second web page with the content of the protected web page to determine similarity between the two web pages. Various tests usable to determine similarity between the two web pages have been discussed in details above. If the similarity determined is over a predetermined threshold, the second web page is likely to be a counterfeit of the protected web page. Otherwise, the second web page is not likely to be a counterfeit of the protected web page.

If the second web page is likely to be a counterfeit of the protected web page, then the web page protection module may take various course of action to protect the web page against phishing, such as by alerting the user of the second web page being a potential counterfeit, reporting the second web page to an administrator, blocking access to the second web page, etc. Details of some of the possible course of action have been discussed above.

Figure 4:
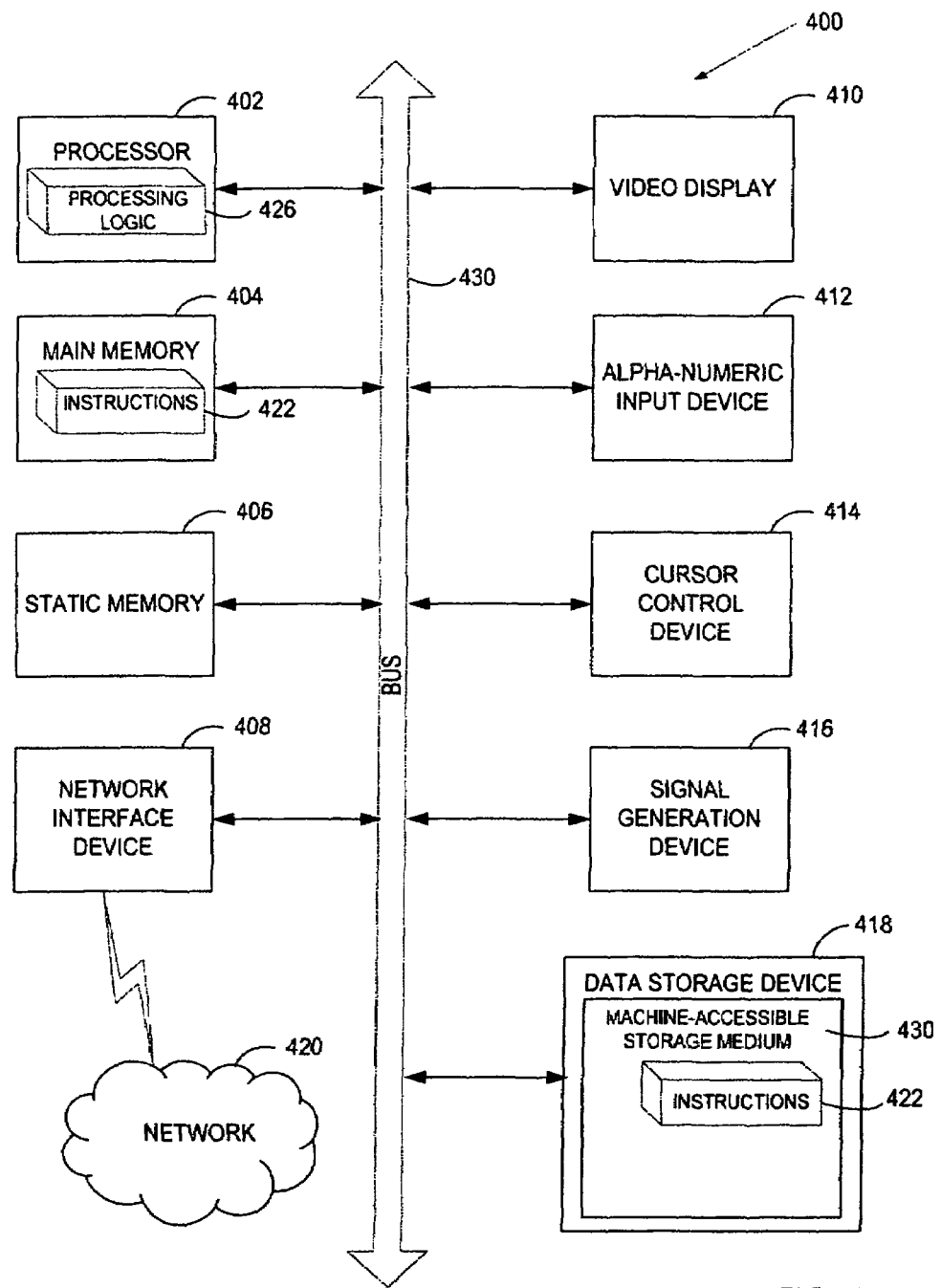
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a method and apparatus for protecting web pages against phishing have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   integrating, by a processing device of a client machine, a user interface control into a graphical user interface (GUI) of a network access application executing on the client machine;
   receiving, by a user input device of the client machine, a request from a user via the user interface control to protect a first web page from a second web page;
   caching first content of the first web page in a storage device at the client machine in response to the request;
   followed by caching the first content of the first web page in the storage device at the client machine at predetermined periods of time;
   comparing, by a processing device of the client machine, the first content of the first web page with second content of the second web page for a similarity between the first and second content;
   assigning, by the processing device, a value to the similarity between the first and second content;
   determining, by the processing device, that the value of the similarity passed a threshold value of a plurality of threshold values each corresponding to a different protective action of a plurality of protective actions that protect the first web page from the second web page; and
   performing, by the processing device, a protective action of the plurality of protective actions corresponding to the threshold value that the value of the similarity passed;
   wherein the plurality of threshold values are adjustable independent of each other by the user via the user interface control.

2. The method of claim 1, wherein the plurality of actions comprise at least one of: alerting the user of the second web page of a counterfeit of the first web page, reporting the second web page to a system administrator, blocking the second web page, or reporting the second web page to a database of counterfeit web pages.

3. The method of claim 1, wherein caching comprises:
   caching the first content of the first web page in the storage device at the client machine every time the user visits the first web page.

4. The method of claim 1, wherein the network access application comprises an Internet browser.

5. The method of claim 1, wherein caching comprises maintaining a current version of the first content of the first web page.

6. The method of claim 1, wherein the value of the content similarity comprises an absolute difference of a word count of a word in the first content and a word count of the word in the second content.

7. The method of claim 1, further comprising:
   allowing, by the processing device, the user to adjust each of the plurality of thresholds.

8. An apparatus comprising:
   a storage device;
   a network interface device communicably coupled to the storage device, the network interface device to access a network;
   a user input device communicably coupled to the storage device and the network interface device, the user input device to control a first user interface control coupled to a graphical user interface (GUI) of a network access application executing on the apparatus, the first user interface control to allow the user to submit the request; and
   a processing device communicably coupled to the storage device, the network interface device, and the user input device, the processing device to:
      execute a web page protection module to protect a first web page accessible by the network access application over the network from a second web page in response to a request from a user received via the first user interface control;
      cache first content of the first web page in the storage device responsive to the request;
      followed by cache the first content of the first web page in the storage device at the client machine at predetermined periods of time;
      compare the first content of the first web page with second content of the second web page for a similarity between the first and second content;
      assign a value to the similarity between the first and second content;
      determine that the value of the similarity passed a threshold value of a plurality of threshold values each corresponding to a different protective action of a plurality of protective actions that protect the first web page from the second web page; and
      perform a protective action of the plurality of protective actions corresponding to the threshold value that the value of the similarity passed;
      wherein the plurality of threshold values are adjustable independent of each other by the user via the user interface control.

9. The apparatus of claim 8, further comprising:
   the storage device to store a buffer to cache the first content of the first web page every time the user visits the first web page.

10. The apparatus of claim 8, wherein the plurality of actions comprise at least one of: alerting the user of the second web page of a counterfeit of the first web page, reporting the second web page to a system administrator, blocking the second web page, or reporting the second web page to a database of counterfeit web pages.

11. The apparatus of claim 8, wherein the network access application comprises an Internet browser.

12. The apparatus of claim 8, further comprising:
   a server to host the first web page;
   the network coupled to the server; and
   the network interface device coupled to the network.

13. The apparatus of claim 8, wherein the processing device is further to execute the web page protection module to apply a form test on the second web page to determine a probability of the second web page is a counterfeit of the first web page.

14. The apparatus of claim 8, wherein the processing device is further to execute the web page protection module to determine if the second web page contains any form having one or more editable fields, and to alert the user that the second web page is likely to be a counterfeit of the first web page if the second web page contains a form having one or more editable fields.

15. The apparatus of claim 8, wherein caching comprises maintaining a current version of the first content of the first web page.

16. The apparatus of claim 8, wherein the second web page is determined to be a counterfeit of the first web page if an absolute difference of the similarity between the first content and the second content is below a threshold of the plurality of thresholds.

17. The apparatus of claim 8, further comprising:
the user input device to control a second user interface control to adjust each of the plurality of thresholds.

18. A non-transitory machine-readable storage medium that provides instructions that, if executed by a processing device, will cause the processing device to perform operations comprising:
integrating, by the processing device of a client machine, a user interface control into a graphical user interface (GUI) of a network access application executing on the client machine;
receiving, by a user input device of the client machine, a request from a user via the user interface control to protect a first web page from a second web page;
caching first content of the first web page in a storage device at the client machine in response to the request;
followed by caching the first content of the first web page in the storage device at the client machine at predetermined periods of time;
comparing, by a processing device of the client machine, the first content of the first web page with second content of the second web page for a similarity between the first and second content;
assigning, by the processing device, a value to the similarity between the first and second content;
determining, by the processing device, that the value of the similarity passed a threshold value of a plurality of threshold values each corresponding to a different protective action of a plurality of protective actions that protect the first web page from the second web page; and
performing, by the processing device, a protective action of the plurality of protective actions corresponding to the threshold value that the value of the similarity passed;
wherein the plurality of threshold values are adjustable independent of each other by the user via the user interface control.

19. The non-transitory machine-readable storage medium of claim 18, wherein the plurality of actions comprise at least one of: alerting the user of the second web page of a counterfeit of the first web page, reporting the second web page to a system administrator, blocking the second web page, or reporting the second web page to a database of counterfeit web pages.

20. The non-transitory machine-readable storage medium of claim 18, wherein protecting the web page comprise:
caching the first content of the first web page in the storage device at the client machine every time the user visits the first web page.

21. The non-transitory machine-readable storage medium of claim 18, wherein the network access application comprises an Internet browser.

22. The non-transitory machine-readable medium of claim 18, wherein caching comprises maintaining a current version of the first content of the first web page.

23. The non-transitory machine-readable medium of claim 18, wherein the second web page is determined to be a counterfeit of the first web page if an absolute difference of the similarity between the first content and the second content is below a threshold of the plurality of thresholds.

24. The non-transitory machine-readable storage medium of claim 18, wherein the operations further comprise:
allowing, by the processing device, the user to adjust each of the plurality of thresholds.

\* \* \* \* \*